United States Patent Office 3,647,914
Patented Mar. 7, 1972

3,647,914
ETHYLENE OLIGOMERIZATION
Peter W. Glockner, Alameda, Wilhelm Keim, Berkeley, and Ronald F. Mason, Mill Valley, Calif., assignors to Shell Oil Company, New York, N.Y.
No Drawing. Filed Nov. 4, 1969, Ser. No. 874,058
Int. Cl. C07c 3/10
U.S. Cl. 260—683.15 D       12 Claims

ABSTRACT OF THE DISCLOSURE

Ethylene is oligomerized to a mixture of olefinic products of high linearity in the presence of a nickel chelate of a bidentate ligand having a tertiary organophosphorus moiety and a functional group selected from hydroxymethyl, mercaptomethyl, hydrocarboyl and hydrocarbyloxycarbonyl substituted on a carbon atom attached directly to the phosphorus atom of the organophosphorus moiety.

BACKGROUND OF THE INVENTION

A variety of polymerization catalysts, both homogeneous and heterogeneous, has been utilized to convert ethylene into olefinic products of higher molecular weight, e.g., to dimer and trimer as well as higher oligomers and polymers. However, the character and relative proportions of the product mixture components are greatly dependent upon the particular catalyst and reaction conditions employed.

SUMMARY OF THE INVENTION

It has now been found that an improved process of oligomerizing ethylene is obtained through the use of a nickel chelate of a chelating ligand having a tertiary organophosphorus moiety and a hydroxymethyl mercaptomethyl, hydrocarboyl or hydrocarbyloxycarbonyl group substituted on a carbon atom attached directly to the phosphorus atom of the organophosphorus moiety. The process is characterized by an ethylene conversion at moderate temperature to a product mixture containing oligomeric products, e.g., dimer, trimer, tetramer and higher oligomers, which are highly linear in character and predominantly alpha-olefins.

DESCRIPTION OF THE PREFERRED EMBODIMENTS

The catalyst

The nickel compound employed as catalyst for the oligomerization process comprises an atom of nickel chelated with a chelating ligand having a tertiary organophosphorus moiety and a functional group selected from hydroxymethyl, mercaptomethyl, hydrocarboyl or hydrocarbyloxycarbonyl substituted on a carbon atom attached directly to the phosphorus atom of the organophosphorus moiety. Although it is not desired to be bound by any particular theory, it appears likely that the catalyst molecule undergoes chemical transformation during the course of the oligomerization reaction possbily involving coordination and/or bonding of ethylene to the nickel moiety. However, it appears likely that the phosphorus-containing chelating ligand remains complexed and/or chemically bonded to the nickel moiety during the course of the oligomerization reaction and that this complex of the nickel and the chelating ligand is the effective catalytic species of the oligomerization process. In any event, the phosphorus-containing chelating ligand is an essential component of the catalyst and provided the nickel catalyst contains the required phosphorus-containing ligand, the nickel catalyst may be complexed with a variety of additional organic complexing ligands.

Generically, the catalyst as provided to the reaction mixture comprises an atom of nickel complexed or chemically bonded to the phosphorus-containing chelating ligand and sufficient organic complexing ligands to satisfy the coordination number of the nickel atom, which coordination number is preferably four. The phosphorus-containing ligand is a tertiary organophosphorus compound having a hydoxymethyl, mercaptomethyl, hydrocarboyl or hydrocarbyloxycarbonyl group substituted on a carbon atom attached directly to the phosphorus atom and generally has from 4 to 100 carbon atoms but preferably from 4 to 60 carbon atoms. A suitable class of tertiary organophosphorus chelating ligands is represented by the Formula I:

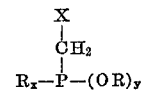

wherein X is hydroxymethyl, mercaptomethyl, hydrocarboyl of up to 10 carbon atoms or hydrocarbyloxycarbonyl of up to 10 carbon atoms, R is a monovalent organo group, $x$ and $y$ are zero, one or two and the sum of $x$ and $y$ is two, with the proviso that when $x$ is two the R groups may together with the phosphorus atom form a mono- or bicyclic heterocyclic phosphine having from 5 to 7 carbon atoms in each ring thereof.

Exemplary hydrocarboyl X substituents are alkanoyl of up to 6 carbon atoms such as acetyl, propanoyl, and hexanoyl; alkaryloyl and aryloyl such as benzoyl, toluoyl, and xyloyl.

Exemplary hydrocarbyloxycarbonyl X substituents are carboalkoxy such as carbomethoxy and carbethoxy; carboaralkoxy such as carbobenzyloxy, and carboaryloxy such as carbophenoxy and carbonaphthoxy.

The R group is an organo group of from 1 to 20 carbon atoms, preferably of from 1 to 10 carbon atoms, and is preferably free from acetylenic unsaturation. R is therefore suitably saturated aliphatic, i.e., acyclic saturated aliphatic as well as saturated cycloaliphatic; alkenyl, i.e., acyclic alkenyl as well as cycloalkenyl; or is aromatic, preferably mononuclear aromatic, and is a hydrocarbyl group containing only atoms of carbon and hydrogen or is substituted-hydrocarbyl group containing in addition to atoms of carbon and hydrogen other atoms such as oxygen, sulfur, nitrogen, and halogen, particularly halogen of atomic number of from 9 to 53 inclusive, i.e., fluorine, chlorine, bromine, or iodine, which additional atoms are present in functional groups such as alkoxy, aryloxy, carboalkoxy, alkanoyloxy, halo, trihalomethyl, cyano, sulfonylalkyl and like groups having no active hydrogen atoms. The R groups are preferably hydrocarbyl containing only the atoms of hydrogen and carbon. Whenever $x$ is 1 or 2 and the R groups contain functional groups, it is preferred that any carbon atoms attached directly to the phosphorus atom be free of functional groups, i.e., any functional groups are not substituted on a carbon atom attached directly to the phosphorous atom.

Illustrative of suitable R groups are hydrocarbon alkyl R groups such as methyl, ethyl, propyl, isobutyl, lauryl, stearyl, cyclohexyl and cyclopentyl; hydrocarbon alkenyl R groups such as butenyl, hexenyl, cyclohexenyl; alkyl or alkenyl groups having aromatic substituents such as benzyl, phenylcyclohexyl and phenylbutenyl; and substituted-hydrocarbyl R groups such as 4-bromohexyl, 4-carbethoxybutyl, 3-cyanopropyl, 4-chlorocyclohexyl and 4-acetoxybutenyl. Aromatic R groups are exemplified by hydrocarbyl aromatic groups such as phenyl, tolyl, xylyl, p-ethylphenyl, and substituted-hydrocarbyl aromatic groups such as p-methoxyphenyl, m-chlorophenyl, m-trifluoromethylphenyl, p-propoxyphenyl, p-cyanophenyl, o-acetoxyphenyl and m-methylsulfonylphenyl.

Illustrative ligands of Formula I wherein $x$ is two are tertiary organophosphines such as dibutyl(2-hydroxyethyl)phosphine,
diphenyl(2-hydroxyethyl)phosphine,
di-p-chlorophenyl(2-hydroxyethyl)phosphine,
dimethyl(2-mercaptoethyl)phosphine,
methyl(phenyl)(2-mercaptoethyl)phosphine,
diethyl(2-ketopropyl)phosphine,
diphenyl(2-phenyl-2-ketoethyl)phosphine,
diphenyl(carbethoxymethyl)phosphine,
dicyclohexyl(carbomethoxymethyl)phosphine,
di-p-methoxyphenyl(carbophenoxymethyl)phosphine and
diphenyl(carbobenzyloxymethyl)phosphine.

Illustrative ligands of Formula I wherein $x$ is one and $y$ is one are organophosphinous acid esters such as ethyl phenyl(2-hydroxyethyl)-phosphinous acid ester, phenyl phenyl(2-mercaptoethyl)phosphinous acid ester, cyclohexyl cyclohexyl(2-ketopropyl)phosphinous acid ester, benzyl benzyl(carbomethoxymethyl)phosphinous acid ester and p-acetoxyphenylbutyl(carbophenoxymethyl)phosphinous acid ester.

Illustrative ligands of Formula I wherein $y$ is two are organophosphonous acid esters such as dipropyl (2-hydroxyethyl)phosphonous acid esters, diphenyl (2-mercaptomethyl)phosphonous acid ester, dimethyl (2-ketobutyl)phosphonous acid ester and diphenyl(carbomethoxymethyl)phosphonous acid ester.

Illustrative bidentate cyclic phosphines of Formula I wherein $x$ is two and the R groups are joined to form heterocyclic rings are monocyclic tertiary phosphines such as 5-(2-hydroxyethyl)-5-phosphacyclopentane,
6-(2-mercaptoethyl)-6-phosphacyclohexane,
7-(2-ketopropyl)-7-phosphacycloheptane;

and bicyclic tertiary phosphines such as 9-(2-hydroxyethyl)-9-phosphabicyclo(4.2.1)nonane,
9-(2-mercaptoethyl)191phosphabicyclo(3.3.1)nonane,
9-(3-phenyl-2-ketopropyl)-9-phosphabicyclo(3.3.1)nonane,
9-(carbomethoxymethyl)-9-phosphabicyclo(4.2.1)nonane,
8-(2-hydroxyethyl)-8-phosphabicyclo(3.2.1)-octane and
8-(2-mercaptoethyl)-8-phosphabicyclo(2.2.2)octane.

Organophosphine ligands of Formula I ($x$ is two) are preferred over the organophosphonous acid ester ligands of Formula I ($y$ is 2) or the organophosphinous acid ester ligands of Formula I ($y$ is 1, $x$ is 1). Particularly preferred tertiary organophosphines are those wherein both R groups are hydrocarbyl and X is hydroxymethyl or alkanoyl.

In terms of the phosphorus-containing ligands of Formula I the nickel catalyst may be represented by the Formula II:

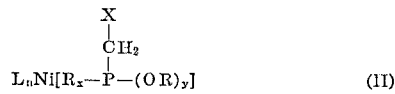

(II)

wherein R, X, $x$ and $y$ have the same significance as defined in Formula I, L is an organic complexing ligand and $n$ is one or two. It is to be understood that the nickel catalyst as depicted in Formula II represents only the empirical composition of the nickel catalyst and the precise nature of the bonding between the phosphorus-containing ligand and the nickel moiety is not definitely known. However, it is considered likely that the nickel is in a low valence state, e.g., zero-valent or mono-valent nickel.

The organic complexing ligand L is any ligand other than the required phosphorus-containing ligand which organic ligand is complexed to the nickel atom so as to satisfy the coordination number of the nickel atom. In general, organic complexing ligands such as carbon monoxide, organoarsines, organostibines, organobismuthines, and like non-ionic organic ligands which are complexed to the nickel moiety are satisfactory. However, preferred complexing ligands are olefinically unsaturated compounds of from 2 to 20 carbon atoms, of up to 4 olefinic linkages and of up to 3 carbocyclic rings. A particularly preferred class of olefinically unsaturated compounds are olefins of from 2 to 12 carbon atoms and represented by the Formula III:

(III)

wherein R' and R" independently is hydrogen, alkyl, cycloalkenyl, aralkyl, aryl or alkaryl of up to 8 carbon atoms with the proviso that the R' and R" groups may together form a divalent aliphatic moiety of from 2 to 10 carbon atoms and of up to three additional olefinic double bonds as the sole carbon-carbon unsaturation.

Illustrative olefins of Formula III therefore include ethylene propylene, 2-butene, 1-pentene, 1-hexene, 1-octene, 1-decene, butadiene, isoprene, 1,3,5-octatriene, 1,3,7-octatriene, cyclopentene, cycloheptene, cyclopentadiene, cyclohexa-1,3-diene, cycloocta-1,5-diene, cyclooctatriene, cyclooctatetraene, and cyclododecatriene.

Illustrative nickel catalysts of Formula II therefore included nickel complexes such as diethylene-diphenyl(2-hydroxyethyl)phosphine-nickel,
cyclooctadiene-dibutyl(2-mercaptoethyl)phosphine-nickel,
butadiene-[di-p-chlorophenyl(2-hydroxyethyl)phosphine]-nickel,
cyclooctadiene-[diphenyl(2-ketopropyl)phosphine]-nickel,
cyclooctatetraene[9-(2-ketopropyl)-phosphabicyclo
 (3.3.1)nonane]-nickel and
1,3,7-octatriene-[9-(carbopropoxymethyl)phosphine]-nickel.

The nickel catalyst employed in the oligomerization process is prepared by a variety of methods. In a preferred method, the catalyst composition is prepared by contacting an olefin-nickel compound and the bidentate phosphorus-containing ligand. One class of olefin-nickel compounds useful as catalyst precursors are zero-valent nickel compounds represented by the Formula IV:

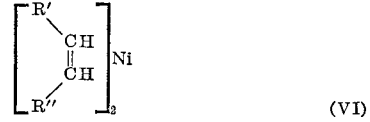

(VI)

wherein R'CHCHR" has the same significance as defined in Formula III. Illustrative nickel compounds of the Formula IV are therefore bis(cyclooctadiene)nickel(O), bis(cyclooctatetraene)nickel(O), and bis(1,3,7-octatriene)-nickel(O).

Another class of olefin-nickel compounds useful as catalyst precursors is π-allyl nickel compounds wherein the nickel moiety is bonded to a π-allylic moiety characterized by delocalization of the electronic contribution of the π-allyl moiety among three contiguous carbon atoms. One suitable type of π-allyl nickel compounds is represented by the Formula V:

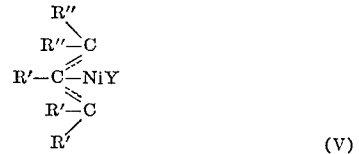

(V)

wherein R' and R" independently are hydrogen, alkyl, cycloalkyl, alkenyl, cycloalkenyl, aralkyl, aryl or alkaryl of up to 8 carbon atoms, Y is halogen, preferably halogen of atomic number from 17 to 35 inclusive, i.e., chlorine or bromine, alkoxy or alkanoyloxy of up to 10 carbon atoms, and the dotted line designation represents the electronic delocalization among the three illustrated contiguous carbon atoms, with the proviso that R" together with one R' may form a divalent alkylene moiety of 2 to 10 carbon atoms, preferably 2 to 5, and up to 3 additional olefinic double bonds. When considered as a whole, preferred π-allyl moieties have from 3 to 12 carbon atoms and are otherwise free from aliphatic unsaturation unless the π-allyl moiety is part of a closed ring system.

Illustrative of suitable π-allyl nickel halides of the above Formula V are π-allylnickel chloride, π-allylnickel bromide, π-crotylnickel chloride, π-methylallylnickel chloride, π-ethylallylnickel chloride, π-cyclopentenylnickel bromide, π-cyclooctenylnickel chloride, π-cyclooctadienylnickel chloride, π-cinnamylnickel bromide, π-phenylallylnickel chloride, π-cyclohexenylnickel bromide, π-cyclododecenylnickel chloride and π-cyclododecatrienylnickel chloride. Although the complex of the above Formula V and other π-allyl nickel halides probably exist independently in the form of a dimer, for convenience and simplicity the π-allyl nickel halides are herein depicted and named as monomeric species.

Other suitable π-allyl nickel compounds of Formula V are π-allylnickel acetate, π-methylallylnickel propionate, π-cyclooctenylnickel octoate, π-allylnickel methoxyate and π-allylnickel ethoxyate.

Another suitable type of π-allyl nickel compounds useful as catalyst precursors is bis-π-allyl nickel compounds represented by the Formula VI:

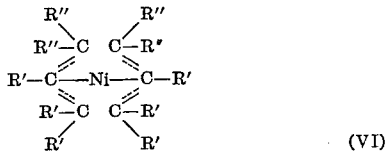

(VI)

wherein R″, R′ and the dotted line designation have the same significance as defined in Formula V, with the proviso that R″ together with one R′ of the same π-allylic moiety may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation unless the allyl moiety is part of a closing ring system. Illustrative of suitable bis-π-allyl nickel compounds of the above Formula VI are bis-π-allyl nickel, bis-π-methallyl nickel, bis-π-cinnamylnickel, bis-π-octadienylnickel, bis-π-cyclohexenylnickel, π-allyl-π-methallylnickel, and bis-π-cyclooctatrienylnickel.

The olefin-nickel catalyst component and the phosphorus-containing ligand catalyst component are generally contacted in substantially equimolar amounts, e.g., the molar ratio of olefin-nickel compound to the ligand varies from about 1.2:1 to 1:1.2, but is preferably about 1:1. The catalyst composition is suitably preformed by contacting the catalyst precursors in an inert diluent, e.g., diluents employed for the polymerization process. In another modification, however, the catalyst precursor components are contacted in the presence of the ethylene reactant during the initiation of the oligomerization process. By any modification, the catalyst precursor components are contacted at temperatures from about 25° C. to 100° C.

The nickel catalyst is suitably employed as unsupported material. In certain modifications, however, it has been found desirable to employ the nickel catalyst supported on inorganic, solid catalyst carriers which are normally solid under reaction conditions and are heterogeneous, i.e., are substantially insoluble in the reaction medium. Illustrative of suitable inorganic, solid catalyst carriers are inorganic oxides such as alumina and inorganic materials known as siliceous refractory oxides. Suitable siliceous refractory oxides include synthetic components as well as acid treated clays and similar materials such as kieselguhr or crystalline macroreticular aluminosilicates known in the art as molecular sieves. In general, synthetic siliceous catalyst carriers are preferred over natural occurrings materials or molecular sieves, and exemplary synthetic siliceous refractory catalyst carriers include silica-alumina, silica-magnesia, silica-alumina-titania, silica-alumina-zirconia, silica-titania-zirconia, silica-magnesia-alumina and the like.

When the nickel catalyst is supported, the amount of catalyst composition to carrier is not critical. In general, amounts of nickel catalyst from about 0.01% to about 40% by weight, based on the catalyst carrier, are satisfactory, with amounts from about 0.1% to about 20% by weight, calculated on the same basis, being preferred. The nickel catalyst is introduced onto the catalyst carrier in any suitable manner. In one modification, the supported catalyst composition is prepared by intimately contacting the pre-formed catalyst and the carrier in an inert diluent, preferably the same inert diluent employed for preparing the nickel catalyst. In another modification, the supported catalyst can be prepared directly by contacting the nickel catalyst precursors in the presence of the catalyst carrier in a suitable inert diluent.

The amount of nickel catalyst employed in the oligomerization process is not critical. In general, amounts of the nickel catalyst of from 0.001% to about 100% by weight based on ethylene are satisfactory with amounts of from about 0.01% to about 25% by weight on the same basis being preferred.

The reaction conditions: The ethylene is contacted with the catalyst composition or the catalyst precursor components in the liquid phase in the absence or presence of reaction solvent or diluent which is liquid at reaction temperature and pressure. Illustrative polar-organic solvents are aromatic compounds such as benzene, toluene, chlorobenzene and oxygenated hydrocarbons such as dialkyl ketones, e.g., acetone, methyl ethyl ketone and ethyl butyl ketone; cycloalkyl ethers, e.g., dioxane, tetrahydrofuran, and tetrahydropyran; acyclic alkyl ethers, e.g., dimethoxyethane, diethylene glycol dimethyl ether and dibutyl ether. Other suitable organic solvents include nitriles such as acetonitrile and propionitrile; dialkylamides such as dimethylformamide and N-methylpyrrolidone and dialkylsulfoxides such as dimethylsulfoxide. Still other suitable solvents comprise water or water containing a portion of a polar organic co-solvent. Suitable mixtures of water and a polar organic co-solvent vary by volume, from about 40% co-solvent to 80% co-solvent and from about 20% water to 80% water. Alkanes and alkenes, including cycloalkanes and cycloalkenes, of from 5 to 20 carbon atoms such as butene-1, isopentane, pentene, cyclopentane, cyclohexane, isohexane, heptane, isooctane, decane, decene-1, dodecane, hexadecene and eicosane are also suitable reaction solvents. In many modifications of the polymerization process, a portion of the oligomeric product suitably serves as the reaction diluent and no added diluent is employed. When diluent is utilized, however, amounts up to about 30 moles of diluent per mole of ethylene are satisfactory. Preferred reaction diluents and solvents are aromatic hydrocarbons, lower dialkylsulfoxides, lower alkyl nitriles, alkanes, or mixtures thereof.

The process is suitably conducted in an inert reaction environment so that the presence of reactive materials such as oxygen is desirably avoided. Reaction conditions are therefore substantially oxygen-free.

The precise method of establishing ethylene/catalyst contact is not critical. In one modification, the catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene reactant in liquid phase solution in the reaction diluent through a reaction zone in which a supported catalyst composition is maintained. By any modification, the polymerization process is conducted at moderate temperatures and pressures. Suitable reaction temperatures vary from about 10° C. to 250° C., but preferably from 30° C. to 100° C. The reaction is conducted at or above atmospheric pressure. The precise pressure is not critical, so long as the reaction mixture is maintained substantially in a non-gaseous phase. Typical pressures vary from about 10 p.s.i.g. to 5000 p.s.i.g. with the range from about 100 p.s.i.g. to 1000 ps.i.g. being preferred.

The products are separated and recovered from the reaction mixture by conventional methods such as fractional distillation, selective extraction, filtration, adsorption and the like The reaction diluent, catalyst and any unreacted ethylene are recycled for further utilization.

The ethylene oligomer products are materials of established utility and many are chemicals of commerce. The products are converted by conventional "Oxo" processes to aldehydes which are hydrogenated with conventional catalysts to the corresponding alcohols. Alternatively, the product olefins are converted to secondary alcohols by sulfuric acid-catalyzed hydration. The $C_{12}-C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

To further illustrate the improved process of the invention and the novel catalyst composition therefor, the following examples are provided.

EXAMPLE I

An oligomerization catalyst was prepared by contacting 0.5 g. of bis-1,5-cyclooctadienenickel (O) and 0.35 g. of 9 - (2 - hydroxyethyl)-9-phosphabicyclo(3.3.1)nonane and 9- (2-hydroxyethyl)-9-phosphabicyclo(4.2.1)nonane in 30 ml. of benzene at about 25° C. The resulting benzene catalyst solution was then contacted with 10 g. of ethylene in a stirred autoclave. The reaction conditions and results are provided in Table I as Run I.

EXAMPLE II

An oligomerization catalyst was prepared by contacting 0.5 g. of bis-1,5-cyclooctadienenickel(O) and 0.5 g. of diphenyl(carbethoxymethyl)phosphine in 30 ml. of benzene at about 25° C. The resulting catalyst solution was then contacted with 10 g. of ethylene in a stirred autoclave. The reaction conditions and results are provided in Table I as Run II.

EXAMPLE III

An oligomerization catalyst was prepared by contacting 1.25 g. of bis-1,5-cyclooctadienylnickel(O) and 0.9 g. of a mixture of 9 - (2-ketopropyl)-9-phosphabicyclo(3.3.1) nonane and 9 - (2 - ketopropyl)-9-phosphabicyclo(4.2.1) nonane in 30 ml. of benzene at 25° C. The resulting catalyst solution was then contacted with 10 g. of ethylene in a stirred autoclave. The reaction conditions and results are provided in Table I as Run III.

TABLE I

| Run No. | I | II | III |
|---|---|---|---|
| Reaction conditions: | | | |
| Time, hours | 15 | 15 | 5 |
| Temperature, °C | 100 | 100 | 50 |
| Ethylene pressure, p.s.i.g | 500 | 500 | 500 |
| Ethylene conversion, percent | 43 | 10 | 53 |
| Gram oligomer product/gram Ni/hour | 2.4 | 0.5 | 4 |
| Product distribution: | | | |
| Weight, percent | | | |
| $C_4$ | 26 | 24 | 23 |
| $C_6$ | 21 | 21 | 20 |
| $C_8$ | 14 | 15 | 16 |
| $C_{10}$ | 12 | 12 | 13 |
| $C_{12}$ | 8 | 9 | 10 |
| $C_{14}$ | 7 | 8 | 7 |
| $C_{16}$ | 5 | 4 | 5 |
| $C_{18}$ | 3 | 3 | 3 |
| $C_{20}+$ | 2 | 4 | 3 |
| Linearity, percent | >95 | >95 | >95 |
| Terminal olefin, percent | >91 | >91 | >93 |

EXAMPLE IV

By a procedure similar to that of Example I, an oligomerization catalyst is prepared by contacting substantially equimolar amounts of π-allylnickel bromide and diphenyl (mercaptomethyl)phosphine in benzene solution. The resulting catalyst mixture is then contacted with ethylene at elevated temperature and pressure to produce a good yield of oligomeric products.

EXAMPLE V

By a procedure similar to that of Example I, an oligomerization catalyst is prepared by contacting substantially equimolar amounts of bis-π-allyl nickel and diethyl (carbobenzyloxymethyl)phosphine in benzene solution. The resulting benzene catalyst solution is then contacted with ethylene at elevated temperature and pressure to produce a good yield of oligomeric products.

EXAMPLE VI

By a procedure similar to that of Example I, an oligomerization catalyst is prepared by contacting equimolar amounts of π-ethylallylnickel acetate and di-p-chlorophenyl(benzoylmethyl)phosphine in benzene solution. The resulting benzene catalyst solution is then contacted with ethylene at elevated temperature and pressure to produce a good yield of oligomeric products.

EXAMPLE VII

A mixture of 31 g. of 2-bromoethanol and 35.9 g. of 9-H-9-phosphabicyclo(3.3.1)nonane in 150 ml. of benzene and 100 ml. of t-butyltoluene was heated under reflux for 7 hours. After cooling overnight, the precipitated 9-H-9(2-hydroxyethyl)bicyclo(3.3.1)nonyl - 9-phosphonium bromide was filtered, washed with benzene and dried. The crude phosphonium bromide product weighed 53 g.

A sample of the crude phosphonium bromide product was recrystallized twice from acetonitrile to give the pure phosphonium bromide, M.P. 223–224° C. (dec.). Elemental analysis of the recrystallized phosphonium bromide gave the following results:

Calcd. for $C_{10}H_{10}BrOP$ (percent wt.): C, 45.0; H, 7.5; Br, 29.9; P, 11.6. Found (percent wt.): C, 45.6; H, 7.5; Br, 29.8; P, 11.9.

A 67 g. sample of 9-H-9-(2-hydroxyethyl)bicyclo(3.3.1) nonyl-9-phosphonium bromide was dissolved in 250 ml. of deaerated 50% aqueous ethanol and treated with 21 g. of sodium bicarbonate. The resulting mixture was evaporated and the residue was extracted several times by slurrying with ether. The ether extracts afforded 40.6 g. of crude 9-(2-hydroxyethyl)-9-phosphabicyclo(3.3.1)nonane on evaporation. Recrystallization of the crude phosphine from hexane gave product with a melting range of 49–50° C. Elemental analysis of the recrystallized 9-(2-hydroxyethyl)-9-phosphabicyclo(3.3.1)nonane product gave the following results:

Calcd. for $C_{10}H_{19}OP$ (percent wt.): C, 64.5; H, 10.3; P, 16.6. Found (percent wt.): C, 64.7; H, 10.3; P, 16.4.

EXAMPLE VIII

A sample of 93 g. of chloroacetone was gradually added to a stirred solution of 142 g. of 9-H-9-phosphabicyclo (3.3.1)nonane in 100 ml. benzene and 650 ml. of t-butyltoluene. After the mildly exothermic reaction had subsided, the mixture was maintained at 75–80° C. for about 2 hours. After cooling overnight, the precipitated solid 9-H-9-(2-ketopropyl)-9-phosphabicyclononyl - 9 - phosphonium chloride was washed with benzene and dried. The crude phosphonium chloride salt weighed 190 g.

A 47 g. sample of the crude phosphonium salt in 200 ml. of 50% aqueous methanol was neutralized with 16.8 g. of sodium bicarbonate. The mixture was then evaporated and the resulting residue was extracted with ether. The ether extracts were filtered and evaporated to give a yellow oil which was distilled through a 6″ Vigreaux column to give 21.4 g. of pure 9-(2-ketopropyl)-9-phosphabicyclo (3.3.1)nonane, B.P. 117° C. at 2 mm. of Hg. Elemental analysis of the phosphine gave the following results:

Calcd. for $C_{11}H_{19}OP$ (percent wt.): C, 66.6; H, 9.7; P, 15.6. Found (percent wt.): C, 65.8; H, 9.7; P, 15.2.

We claim as our invention:

1. A process of oligomerizing ethylene by contacting ethylene in liquid phase at a temperature of about 10° C. to 250° C. in the presence of a nickel complex having one chelating ligand represented by the formula

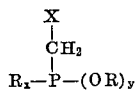

wherein X is hydroxymethyl, mercaptomethyl, hydrocarbyl, or hydrocarbyloxycarbonyl, R is a monovalent organo group of from 1 to 20 carbon atoms, $x+y$ is 0, 1 or 2 and the sum $x+y$ is 2, with the proviso that when $x$ is 2, the R groups may together with the phosphorus atom form a mono- or bicyclic heterocyclic phosphine having from 5 to 7 carbon atoms in each ring thereof.

2. The process of claim 1 wherein the catalyst is provided as a nickel chelate represented by the formula

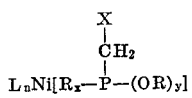

wherein R, X, $x$ and $y$ have the same significance as defined in claim 1, L is an olefinically unsaturated ligand and $n$ is 1 or 2.

3. The process of claim 1 wherein the nickel chelate is prepared by contacting in an inert diluent the chelating ligand of the formula

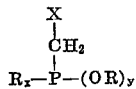

and an olefinic-nickel compound of the formula

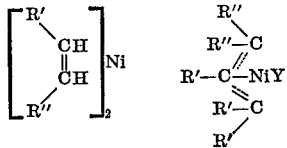

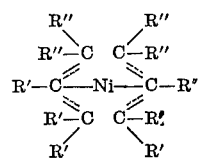

wherein R' and R'' independently are hydrogen, alkyl, cycloalkyl, alkenyl, cycloalkenyl, aralkyl, aryl, or alkaryl of up to 8 carbon atoms and Y is halogen of atomic number 17 to 53 inclusive, alkoxy or alkanoyloxy of up to 10 carbon atoms with the proviso that one R'' together with one R' may form a divalent alkylene moiety of 2 to 10 carbon atoms and of up to three additional olefinic double bonds.

4. The process of claim 3 wherein $x$ is 2.

5. The process of claim 4 wherein the R groups of the chelating ligand are hydrocarbyl.

6. The process of claim 5 wherein X is hydroxymethyl.

7. The process of claim 6 wherein the chelating ligand is 9-(2-hydroxyethyl)-9-phosphabicyclononane.

8. The process of claim 7 wherein the olefinic-nickel compound is bis-cyclooctadienenickel(O).

9. The process of claim 5 wherein X is hydrocarboyl of up to 6 carbon atoms.

10. The process of claim 9 wherein the chelating ligand is 9-(2-ketopropyl)-9-phosphabicyclononane.

11. The process of claim 1 wherein the catalyst is supported on an inorganic oxide support.

12. The process of claim 4 wherein the catalyst is supported on an inorganic oxide catalyst support, the amount of catalyst being of from about 0.1% to about 20% by weight based on catalyst support.

References Cited

UNITED STATES PATENTS

| | | | |
|---|---|---|---|
| 3,379,706 | 4/1968 | Wilke | 260—683.15 X |
| 3,536,778 | 10/1970 | Bergem et al. | 260—683.15 |
| 3,483,269 | 12/1969 | Magoon et al. | 260—683.15 |
| 3,532,765 | 10/1970 | Barnett et al. | 260—683.15 |
| 3,499,842 | 3/1970 | Carlson | 260—439 |

PAUL M. COUGHLAN, Jr., Primary Examiner

U.S. Cl. X.R.

260—429 L, 439 R